April 6, 1965 J. R. PATMORE 3,177,404

MODULARIZED COMPUTER CONSTRUCTION

Filed April 12, 1960 2 Sheets-Sheet 1

INVENTOR.
JAMES R. PATMORE
BY E.A. Petto
ATTORNEY

April 6, 1965 J. R. PATMORE 3,177,404

MODULARIZED COMPUTER CONSTRUCTION

Filed April 12, 1960 2 Sheets-Sheet 2

INVENTOR.
JAMES R. PATMORE

BY E. A. Pettee

ATTORNEY

United States Patent Office 3,177,404
Patented Apr. 6, 1965

3,177,404
MODULARIZED COMPUTER CONSTRUCTION
James R. Patmore, Neptune, N.J., assignor to Electronic Associates, Inc., Long Branch, N.J., a corporation of New Jersey
Filed Apr. 12, 1960, Ser. No. 21,686
3 Claims. (Cl. 317—99)

Figure 1:
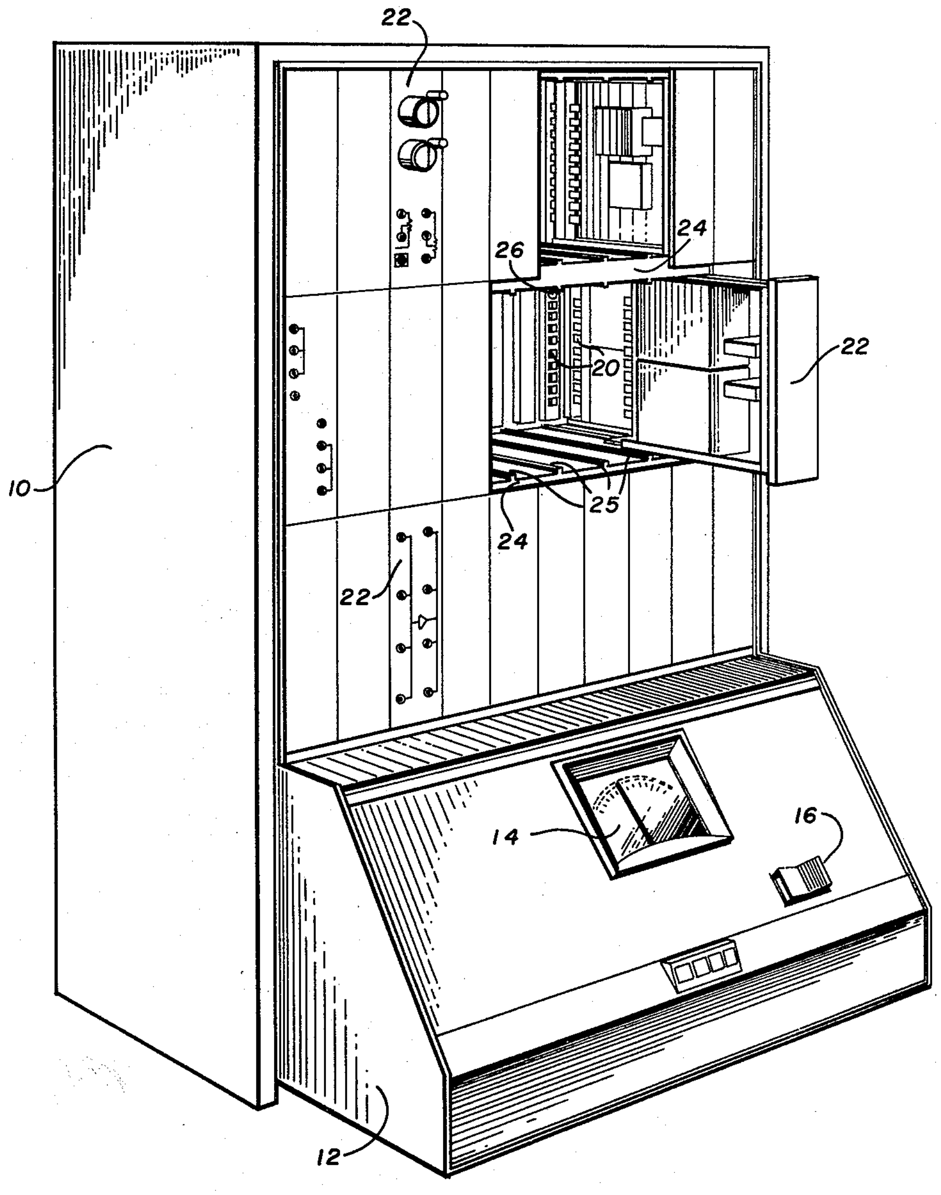

This invention relates generally to computers and more particularly to a modularized analog computer construction.

In its simplest form, the usual analog computer comprises, for the purpose of solving a variety of linear and non-linear differential equations, a plurality of computation components in the form of D.C. amplifiers which can be connected to function as adders or as integrators. In a more complicated form, the amplifiers may be provided with attenuators or the like to extend their range of usefulness. In order to adapt an analog computer for general purpose application in solving a wide variety of complex problems, it has become customary to provide various other computation components such as function generators, multipliers and the like to operate in conjunction with the amplifiers.

In at least some prior art general computers it has become customary to provide a unitary connection panel or patch panel at which all termination connections may be made to the individual computation components. The individual computation components are usually mounted in a unitary support structure at a considerable distance from the patch panel, the terminations of the individual computation components being permanently connected to assigned terminals at the patch panel by wires of substantial length. The individual computation components are then adapted to be connected together at the patch panel by relatively short lengths of wire or patch cord according to desired problem requirements.

In yet other prior art general purpose analog computers, the patch panel is not utilized and the various computation components are mounted in a unitary support structure, the terminations to these components being connected together according to the particular problem requirements by substantially longer lengths of wire or patch cord. More often than not, the patch board arrangement is utilized because of the convenience that it affords to the computer operator. In either of these computer arrangements, whether or not a patch panel is utilized, it becomes necessary to utilize shielded wires or patch cords between the terminations of the individual computation components in order to minimize computation inaccuracies which may arise because of stray currents or the like. When problem requirements become complex, a large number of individual computation components may be required, and it is apparent that the amount of wiring between the components becomes not only excessive, but expensive as well.

The present invention is directed to a computer construction which materially reduces the amount of wiring that must be provided to interconnect the terminations of individual computation components for particular problem requirements. In its simplest form the invention comprises a modularized construction of computation components, which have their terminations brought out to connectors which, when the components are assembled in a support structure, form a convenient patch board.

More particularly, the modular computer structure of the present invention includes a support structure including a plurality of plural poled connector members which are connected to a source of operating potential according to a predetermined arrangement. A plurality of enclosure members are provided, and each have at one end a plural poled connector member adapted to removably engage one of the plural poled connector members in the computer support structure. A termination connector is provided at the other end of each of the enclosure members. Each of the enclosure members contain a computation element or component and the power connections of same are made to the corresponding plural poled connector member; the termination connections are made to the corresponding termination connector. When a plurality of the enclosure members are disposed within the support structure, the termination connectors form a substantially planar patch board at which computer component termination connections may be made. In a preferred form, the enclosure members may be generally rectangular with at least one open side to facilitate the insertion and removal of the individual computation components.

It is, therefore, an object of the present invention to materialy reduce the amount of wiring required between the terminations of computer components.

It is another object of the present invention to eliminate the need for the use of shielded wire between terminations of computation components and the external terminals thereto.

It is still another object of the present invention to provide a modularized computer construction where the end portions of individual computation components form a convenient patch board.

A further object of the present invention is to provide a computer construction where individual computation components may be easily replaced.

Yet another object of the present invention is to provide a computer construction which is economical in manufacture, reliable in operation, and simple to maintain.

Figure 2:
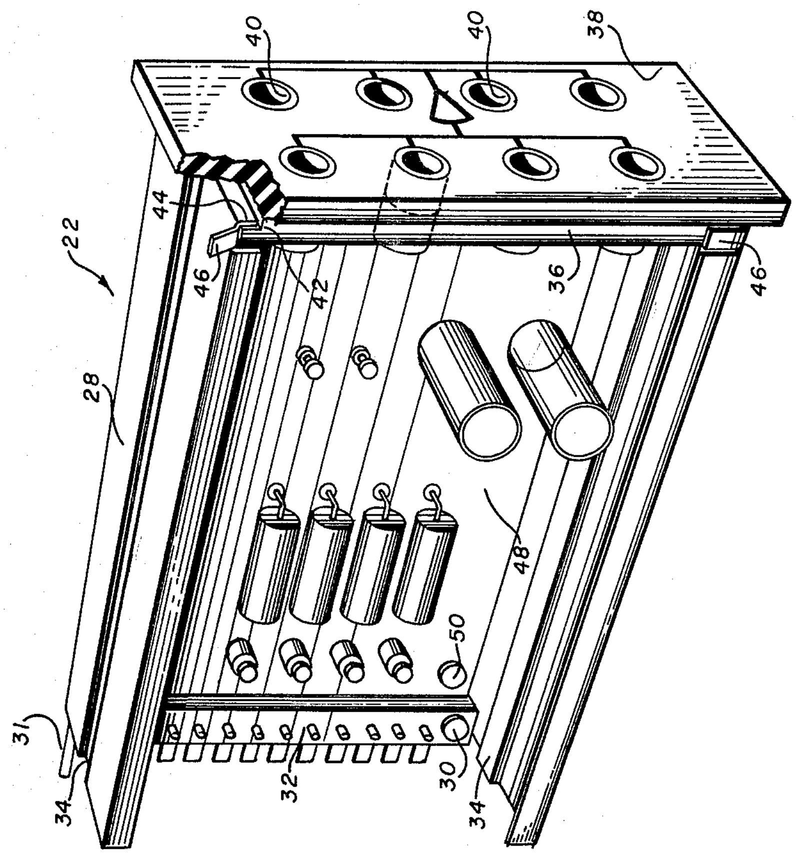

These and other objects, features and advantages will become apparent from the following description of the preferred embodiment of the present invention taken in connection with the accompanying drawings wherein:

FIG. 1 is a perspective view of the present computer structure, shown partially in section; and FIG. 2 is a perspective view of a computation component module, shown partially in section.

Referring now to the drawings, the computer structure of the present invention is shown to include a generally rectangular support structure 10 of suitable material, such as steel, which has an enlarged base portion 12. The base portion 12 may be provided, as shown, with a sloping frontal panel adapted to include the usual indicating devices and operating switches, indicated generally at 14 and 16. The support structure according to the preferred embodiment is shown to include only side and top portions but it is not necessarily limited thereto.

Mounted within the interior of the support structure 10, and rearwardly thereof on a suitable mounting structure 18 are a plurality of plural poled connector members 20. The connector members 20 are preferably mounted with uniform horizontal spacing between adjacent members, the spacing being determined by the width of the individual computation component modules 22 to be hereinafter described. According to the preferred embodiment, the connector members 20 may be further disposed in a vertical fashion comprising a plurality of horizontally disposed rows. The connector members shown in FIG. 1 are preferably of the female type and are interconnected according to any desired arrangement by wires, not shown, which may be disposed within the support structure 10 rearwardly of the connector members 20. The connector members 20 are also connected to one or more sources of operating potential, determined by the power requirements of the computation component modules 22, by wires which are not shown.

Suitable stop members 24 are disposed at the frontal portion of the support structure 10 and mounted substantially intermediate the horizontal rows of the connector members 20. Each of the stop members 24 may be provided with a plurality of guide members 25 for cooperation with corresponding guide detents provided on the individual component modules 22. Similar stop members 24 may also be provided on the bottom surface of the top portion of support structure 10 and on the rearward edge of the sloping panel of the base portion 12. A suitable guide hole 26 may also be provided adjacent to each of the connector members 20 to additionally guide the movement of the individual component modules.

Turning now to FIG. 2 and the construction of the individual component modules 22, these are seen to comprise a generally rectangular and elongated enclosure member 28. The enclosure members are preferably made of a suitable metal, such as steel, with one open side in order to facilitate the insertion and removal of the individual computing elements to be disposed therein. At one end of the enclosure member 26 there is mounted, as by screws 30, a suitable plural poled connector member 32 of the male type which is adapted to removably engage one or more of the plural poled connector members 20. A suitable pin 31 may be mounted adjacent to the connector 32, and be adapted to be inserted in one or more of the guide holes 26 in order to align the plural poles of the connector 32 with corresponding plural poles in one or more of the connector members 20. Suitable detents 34 may be provided along the length of the side walls of the enclosure member 28 to continuously engage vertically aligned pairs of the guide members 25.

A generally rectangular termination connector 36 having an enlarged frontal portion 38 is fixedly mounted at the forward open end of the enclosure member 28. Connector 36 is made of a suitable insulating material, such as diallyl phthalate, and has a plurality of terminals 40 moulded therein. Terminals 40 are preferably cylindrical in form and adapted to receive a male connector member, such as a banana plug. The rearward surface of enlarged portion 38 is adapted to engage the stop members 24 and limit movement of the module 22 inwardly of the support structure 10. The frontal surface of the connector member 36 may be suitably embossed or otherwise marked with suitable indicia or the like to identify the nature or character of the computing element contained therein. For example, the module of FIG. 2 is identified with the usual amplifier symbol to indicate that an amplifier is connected between the four left hand and right hand terminals 40.

A pair of grooves or recesses 42 are provided on the upper and lower edges of the connector 36 adjacent to the rear surface of the enlarged portion 38. Each of the recesses 42 are adapted to slidably receive a turned over lip portion 44 provided at the forward edge of each of the top and bottom side walls of the enclosure member 28. A suitable tab member 46 may be provided on the top and bottom side walls of the enclosure member 28 and be adapted to be bent over and engage connector 38 to retain it in a fixed relation relative to the enclosure member 28 when the recesses 42 are disposed to engage the lip portions 44.

A computing element 48, preferably constructed on a printed circuit card of suitable form, is disposed within the enclosure member 28 and secured therein by suitable fasteners, such as screws 50. The power terminals of the computing element 48 are connected directly to as many poles of the connector member 32 as is required; the terminations, or input and output terminals as the case may be, are tied directly to the corrseponding terminals 40 of the connector 38. In the example of a computing amplifier disposed within the enclosure 28, only the input and the output terminations thereof would be connected to the corresponding terminals 40; all power requirements for the amplifier would be supplied by the connector 32 via a suitable one of the connectors 20.

In use, as determined by the requirements of a particular problem, a plurality of the required computing modules 22 are inserted into the support structure 10, each with its connector 32 engaging a corresponding connector 20. The terminations of the various computing modules may then be connected together by short lengths of unshielded wire or patch cord at the terminals 40. With the connectors and the enclosures 28 made of uniform dimensions, any one computing module can be interchanged physically with any other computing module within the support structure. In operation, only the enlarged end portions 38 of the connectors 36 are visible to the computer operator, and the portions 38 form a convenient patch board which is rectangular and substantially planar in form.

As is apparent from the above description, any of the various required computing components, such as amplifiers, function generators, multipliers and the like can be mounted within a suitable enclosure 28 and the terminations thereof brought out to the terminals 40. With appropriate prearranged power requirements available at the connectors 20, any one of several different computing components may be disposed to engage any one of several connectors 20 within the support structure 10. As at the connectors 20, any one of several different components arises from problem to problem, the individual computing modules can be rearranged or replaced by other and different computing modules to meet expeditiously the needs of the varying problems.

In addition, each of the enclosure members in conjunction with an adjacent enclosure member which covers the open side wall serves admirably to shield the effects of stray currents from other components. The need to shield wires which connect the terminations of the individual computing elements to their respective terminals is eliminated.

The flexible patch board arrangement which results from the disclosed computer arrangement materially extends the usefulness of a computer embodying this construction. With this computer arrangement, it is not necessary, or as a matter of fact desirable, that the support structure be large enough to contain all available computing elements; it only need be large enough to contain the usual number of computing elements required to solve the expected problems which may arise. Special or seldom used computing elements in modular form may be maintained available for these special problems and may be inserted into the support structure when the need for their use arises.

While only one embodiment of the present invention has been shown and described herein, it is to be understood that it is for purposes of illustration only and that various changes may be made therein without departing from the spirit of the invention as defined in the appended claims.

I claim:

1. A computer structure comprising a support structure and a plurality of computer modules, each comprising a substantially rectangular enclosure member having three continuous sides and one open side, each computer module having a first plural poled connector member secured to one end of its respective enclosure member and adapted to removably engage a cooperating plural poled connector member, each of said cooperating connector members being secured to said support structure, a computing unit disposed within each of said enclosure members and having its electrical supply input points operatively connected to poles of said first connector member, and the enclosure member of each computer module having a second plural poled connector member secured to and closing the end opposite to said one end of said enclosure member and having poles thereof connected to the terminations of its respective computing unit for selectively connecting said second connector member with a second connector member of at least one other module located within said support structure of said computer structure.

2. A computer structure comprising a plurality of computing units including power and termination terminals, a support structure including a plurality of plural poled female connectors connected to at least one source of operating potential according to a predetermined arrangement, a plurality of generally rectangular enclosure members each having three continuous sides and one open side extending between its ends, each said enclosure member having at one end a plural poled male connector adapted for removably engaging at least one of said female connectors, a plurality of rectangular insulator members each respectively corresponding to one of said enclosure members and closing the other end thereof, each of said insulator members having thereon a plurality of termination connectors and indicia which diagrammatically identifies a corresponding computing unit, each of said computing units being disposed in one of said enclosure members and operatively connected to said male and termination connectors, said insulator members forming a substantially planar panel at which external connections may be made to said computing units when said male connectors are disposed to engage said female connectors.

3. The computer structure according to claim 2 wherein the one open side of each enclosure member is closed by a continuous side of another enclosure member disposed contiguously thereto, whereby a shield for stray currents is formed enclosing each of said computing units.

References Cited by the Examiner

UNITED STATES PATENTS

| | | | |
|---|---|---|---|
| 2,788,470 | 4/57 | Giel et al. | 317—101 |
| 2,824,264 | 2/58 | Anastapoulos | 317—101 |
| 2,843,806 | 7/58 | O'Neill | 317—100 |
| 2,945,989 | 7/60 | Vogel | 317—100 |

JOHN F. BURNS, *Primary Examiner.*

SAMUEL BERNSTEIN, *Examiner.*

UNITED STATES PATENT OFFICE

CERTIFICATE OF CORRECTION

Patent No. 3,177,404 April 6, 1965

James R. Patmore

It is hereby certified that error appears in the above numbered patent requiring correction and that the said Letters Patent should read as corrected below.

Column 4, line 26, strike out "at the connectors 20, any one of several different" and insert -- the need for additional and different computing --.

Signed and sealed this 7th day of December 1965.

(SEAL)
Attest:

ERNEST W. SWIDER
Attesting Officer

EDWARD J. BRENNER
Commissioner of Patents